(No Model.)
F. P. DEWEY.
PROCESS OF MANUFACTURING PIGMENTS FROM GALENA, &c.
No. 372,898. Patented Nov. 8, 1887.
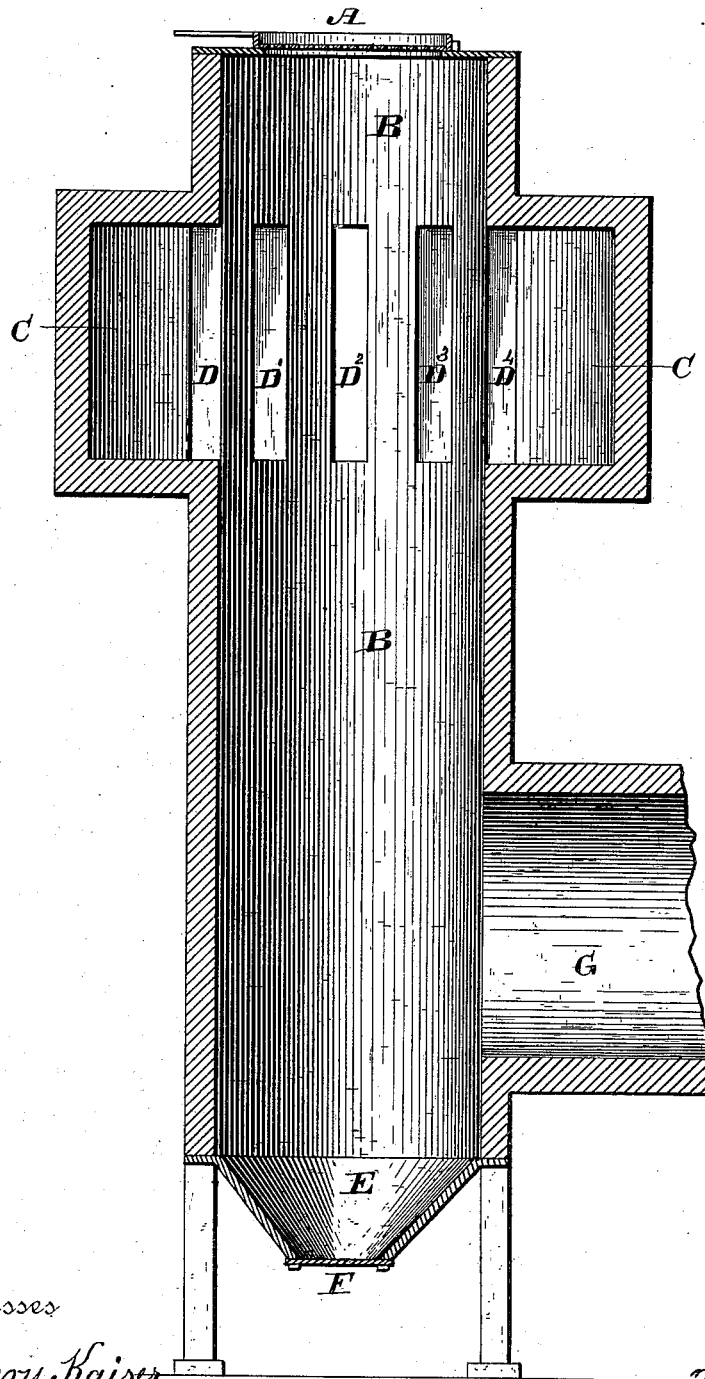
Witnesses
J. Henry Kaiser
Victor J. Evans.
Inventor
Frederic P. Dewey.

UNITED STATES PATENT OFFICE.

FREDERIC P. DEWEY, OF WASHINGTON, DISTRICT OF COLUMBIA.

PROCESS OF MANUFACTURING PIGMENTS FROM GALENA, &c.

SPECIFICATION forming part of Letters Patent No. 372,898, dated November 8, 1887.

Application filed January 31, 1887. Serial No. 226,106. (No specimens.)

*To all whom it may concern:*

Be it known that I, FREDERIC P. DEWEY, a citizen of the United States, residing at Washington, in the District of Columbia, have invented certain new and useful Improvements in Manufacturing Pigments from Galena and other Sulphureted Lead Ores; and I do hereby declare that the following is a full, clear, and exact description of the invention, which will enable others skilled in the art to which it appertains to make and use the same.

Lead pigments have been made by mixing roasted or unroasted pulverized galena with carbon, heating the mixture in a compound reducing and oxidizing furnace, and collecting the volatalized fumes. Lead pigment has been made by feeding pulverized silver lead ores into the flame of an air-blast and submitting the ore to the direct action of a flame. The presence of carbon, flame, or reducing gases in these two processes causes the reduction of an unnecessarily large quantity of metallic lead, and also injures the quality of the product by an admixture of small particles of carbon or smoke from the fuel.

A white pigment has been made by exposing coarse or crushed galena to the joint action of heat and air in a kind of muffle-furnace, excluding the noxious gases of the combustion of the fuel. The galena does not burn, but melts, and is then volatilized. A pigment has also been made by passing powdered galena or other sulphureted lead ore, intimately mixed with air, through retorts heated externally.

I have discovered that when galena or other sulphureted lead ore is pulverized fine enough and once thoroughly ignited by external means the combustion will continue through large volumes of the material until the whole mass is thoroughly oxidized, without any further assistance from external sources. The galena may be pulverized by any of the ordinary means—viz., by stamps, rolls, or other pulverizers. The pulverized material may be spread on any suitable non-combustible floor, and then ignited at one or more points by a jet of gas, by a burning oil-soaked rag, or any other suitable means. Combustion once started, it continues of itself through the whole mass until it is thoroughly oxidized. Since the galena burns without giving off any considerable amount of gas, it is not necessary to provide any special means of draft beyond what may be secured in any well-ventilated work-room. The product of this combustion is open, porous, and but slightly coherent. It grinds and mixes well with oil, has good covering qualities, and forms an excellent basis for lead pigments, but it will rarely be perfectly white. To produce a white paint it must be purified. To accomplish this I thoroughly pulverize it and pass it through a highly-heated combustion-chamber. From the combustion-chamber the pure white paint is delivered to any suitable collecting apparatus. On some accounts it is best to heat the combustion-chamber directly; but where it is desirable to keep the noxious gases of combustion out of the collecting apparatus it may be heated externally. The drawing represents one form of apparatus in vertical section suitable for this purification; but the details may vary greatly from those given.

A is an oscillating sieve showering the pulverized material into the upright stack B.

C is a combustion-chamber in which gas is burned, the heated products of combustion, being admitted to the stack B by suitable openings D D and drawn downward by a gentle draft, which may be produced by a chimney or an exhaust-fan.

E is a hopper for the collection of the white paint which may be drawn off by the slide F.

G is an escape-flue for the gases which will carry some of the paint in suspension, and must therefore be led through some suitable collecting apparatus.

I claim the following improvements in the process of making pigments from galena or other sulphureted lead ores:

The direct process of completely converting finely-pulverized galena or other sulphureted lead ore into pigment by igniting the same in bulk, burning it by self-sustained combustion, and subsequently pulverizing the burned mass and passing it through a highly-heated combustion-chamber, substantially as described.

FREDERIC P. DEWEY.

Witnesses:
W. H. NEWHALL,
G. C. NEALE.